United States Patent
Prüssner et al.

(10) Patent No.: US 7,967,895 B2
(45) Date of Patent: Jun. 28, 2011

(54) PROCESS AND DEVICE FOR REGENERATING THE LOADED SCRUBBING AGENT IN A PHYSICAL GAS WASH

(75) Inventors: Ulrich Prüssner, München (DE); Horst Weiss, München (DE)

(73) Assignee: Linde AG, Wiesbaden (DE)

( * ) Notice: Subject to any disclaimer, the term of this patent is extended or adjusted under 35 U.S.C. 154(b) by 967 days.

(21) Appl. No.: 11/691,765

(22) Filed: Mar. 27, 2007

(65) Prior Publication Data

US 2007/0266853 A1     Nov. 22, 2007

(30) Foreign Application Priority Data

Mar. 28, 2006   (DE) .......................... 10 2006 014302

(51) Int. Cl.
*B01D 53/02* (2006.01)
(52) U.S. Cl. ................ 95/162; 95/181; 95/183; 95/199; 95/230; 95/232; 95/235; 95/236
(58) Field of Classification Search ...................... 95/199
See application file for complete search history.

(56) References Cited

U.S. PATENT DOCUMENTS

| | | | | |
|---|---|---|---|---|
| 3,563,696 A | * | 2/1971 | Benson | ......................... 423/223 |
| 4,430,316 A | * | 2/1984 | Ranke et al. | ................ 423/574.1 |
| 4,938,783 A | * | 7/1990 | Ranke et al. | ................ 48/197 R |
| 5,112,586 A | * | 5/1992 | Baker | ........................... 423/220 |
| 5,948,378 A | * | 9/1999 | Koveal et al. | .................. 423/236 |
| 6,183,540 B1 | | 2/2001 | Thonsgaard | |

FOREIGN PATENT DOCUMENTS

| | | |
|---|---|---|
| DE | 2 260 247 A1 | 6/1974 |
| DE | 196 10 846 A1 | 9/1997 |
| WO | WO 98/32520 A1 | 7/1998 |

\* cited by examiner

*Primary Examiner* — Duane Smith
*Assistant Examiner* — Tiffany N Palmer
(74) *Attorney, Agent, or Firm* — Millen, White, Zelano & Branigan, P.C.

(57) ABSTRACT

For regenerating the loaded washing (scrubbing) agent (6, 7) from a physical gas wash (T1), in which one or more gas components are removed, to a large extent selectively, from a gas mixture (1) to be purified at least in a first of at least two successive washing steps, the loaded washing agent (7) withdrawn from the first washing step is, independently of the remaining quantity of loaded washing agent (6), subjected to a regeneration step (T2a) for separating the gas components (11) which have been selectively removed from the raw gas in the first washing step.

4 Claims, 2 Drawing Sheets

PROCESS AND DEVICE FOR REGENERATING THE LOADED SCRUBBING AGENT IN A PHYSICAL GAS WASH

FIELD OF THE INVENTION

This invention relates to a process for regenerating the loaded washing scrubbing agent from a physical gas wash, in which one or more gas components are removed, to a large extent selectively, from a gas mixture (raw gas) to be purified at least in a first of at least two successive washing steps, and to a device for carrying out the process.

Physical gas washing scrubbing makes use of the capability of liquids to absorb gaseous substances and to maintain them in solution without chemically binding the gases in the process. How well a gas is absorbed by a liquid is expressed by means of the solubility coefficient: the better the gas dissolves in the liquid, the larger its solubility coefficient is. The solubility coefficient is temperature dependent and generally increases with decreasing temperature.

If a gas component i is to be dissolved out of a gas mixture by physical washing, this requires a minimum quantity $W_{min}$ of the liquid being used as washing agent, which can be calculated very easily with the following formula:

$$W_{min} = V/(p \cdot \lambda_i)$$

In the formula, V represents the total quantity of the gas mixture, p represents the pressure prevailing in the gas mixture, and $\lambda_i$ represents the solubility coefficient of the gas component to be washed out relating to the washing agent used. On condition that the solubility coefficients of the components of a gas mixture are sufficiently different from one another, it is possible by correspondingly adapting the quantity of washing agent, to separate, in a single washing step, the gas component having the largest solubility coefficient to a large extent independently of the remaining gas components, i.e. to remove it in a selective manner. With larger quantities of washing agent, further gas components or groups of gas components having similar solubility coefficients can be selectively washed out in subsequent washing steps, using the same principle.

Subsequent to the gas washing, the washed-out gas components are removed from the loaded washing agent, whereby the washing agent is regenerated. The regenerated washing agent is usually reused in the gas wash, while the washed-out gas components are either disposed of or used for economical exploitation.

BACKGROUND OF THE INVENTION

For the purification of raw synthesis gases, which are produced on an industrial scale in gasification plants from coal or/and hydrocarbon feedstocks, for example by reforming with steam or by partial oxidation, and which normally contain some unwanted components, such as water, carbon dioxide ($CO_2$), hydrogen sulfide ($H_2S$) and carbonyl sulfide (COS, physical washing is preferably used. These processes are advantageous, since the raw synthesis gases are presently usually produced at high pressure and the effectiveness of physical washing increases, as a first approximation, linearly with the operating pressure. Methanol washing is of particular relevance for the purification of raw synthesis gases. It makes use of the fact that the solubility coefficients of $H_2S$, COS and $CO_2$ in liquid, cryogenic methanol differ by orders of magnitude from those of hydrogen ($H_2$) and carbon monoxide (CO). Subsequent to the washing process, the methanol is regenerated and returned into the process. Substances such as, for example, hydrogen cyanide (prussic acid, HCN), which is also found in raw synthesis gases, make the regeneration of the methanol washing agent substantially more difficult because they are very strongly bonded to the methanol as a result of their high solubility coefficient. However, hydrogen cyanide remaining and thus concentrating in the methanol is to be avoided, since this poisonous gas is corrosive and, for this reason alone, cannot be tolerated in the products generated from the synthesis gas (CO, $H_2$, oxogas).

According to the prior art, HCN is, for example, washed out with water in a separate wash column which precedes the methanol washing. The loaded washing water, in which the prussic acid is present in strongly diluted form, must be subsequently disposed of in a complex manner or regenerated—e.g. by stripping with air.

Another process makes use of the fact that, compared with $CO_2$, $H_2S$ and COS, HCN has a markedly greater solubility in liquid methanol. This makes it possible to wash out HCN from the synthesis gas in a pre-washing step using comparatively small quantities of methanol (Lurgi publication "The Rectisol Process for Gas Purification"). Here, HCN pre-washing is carried out in a first washing step in a methanol wash column, in which sour gases are washed out in a second washing step, using a quantity of methanol that is adjusted to the solubility of HCN. For regeneration, the methanol washing agent loaded with HCN is supplied to the upper region of a stripping column, while methanol washing agent which is only loaded with sour gases is introduced into the lower region of the stripping column. The stripped sour gases and the HCN are subsequently conducted jointly into a Claus plant, where sulfur is obtained from the sour gases and in which the HCN does not disturb.

In order to prevent concentration of HCN in the methanol washing agent to a large extent, the entire methanol washing agent used for separating sour gases and HCN from the raw synthesis gas must be stripped under conditions which are defined by the solubility coefficient of HCN, therefore requiring a large plant-specific and operational outlay. If the stripping is carried out under less demanding conditions, concentration of HCN in the methanol washing agent, with all its negative repercussions, must be accepted.

It is therefore an object of the present invention to provide a process of the generich type, with which the problems of the prior art with respect to the purification of raw synthesis gas containing hydrogen cyanide can be circumvented.

Upon further study of the specification and appended claims, other objects and advantages will become apparent.

According to the invention, such objects are attained by providing a process and associated apparatus in which the loaded washing agent withdrawn from the first washing step is, independently of the remaining quantity of loaded washing agent, subjected to a regeneration step for separating the gas components which have been selectively removed from the raw gas in the first washing step.

The process according to the invention is particularly suitable for regenerating the loaded washing agent from a methanol wash, in which hydrogen cyanide (HCN) is separated from a raw synthesis gas in a first washing step and sour gases ($H_2S$, COS) and/or carbon dioxide ($CO_2$) are separated from said raw synthesis gas in at least one subsequent washing step by means of liquid, cryogenic methanol. The solubility coefficient of hydrogen cyanide in liquid, cryogenic methanol is approximately 100 times greater than that of sour gases or of $CO_2$. For this reason, hydrogen cyanide can be washed out of the raw synthesis gas using a correspondingly lower quantity of methanol. The comparatively small, portion of the methanol washing agent loaded with HCN is supplied to a dedicated regeneration unit, where it is regenerated under the operating conditions necessary for an extensive separation of HCN, while the predominant portion of the methanol washing agent, which is not loaded with HCN but with sour gases and/or $CO_2$ and can therefore be regenerated in a comparatively simple manner, is subjected to a process, preferably a process for regenerating methanol washing agent that is loaded with sour gases and/or $CO_2$, as is sufficiently well known from the prior art.

According to an embodiment of the process according to the invention, the methanol washing agent loaded with HCN is withdrawn from the methanol wash, preferably heated and expanded into a stripping column, in which a gas stream containing HCN is generated by stripping. The stripping gas required for the stripping is suitably obtained by boiling the sump product of the stripping column, which is achieved by supplying it with heat—for example via a steam heated reboiler. A preferred embodiment of the process according to the invention provides that the gas stream containing HCN is cooled down by heat exchange for enrichment and is thereby partially condensed. Sensibly, the HCN containing gas stream is only cooled down until mainly components of the stripping gas are condensed out in the partial condensation.

In the case that the methanol washing agent loaded with HCN contains water, a variant of the process according to the invention provides that the methanol washing agent loaded with HCN and water is introduced into a simple stripping column in order to strip the HCN, with a methanol/water mixture being withdrawn from the sump of said stripping column and this mixture being supplied to a methanol/water separation column. Another variant of the method according to the invention provides that the methanol washing agent loaded with HCN and water is introduced into a stripping column in order to strip the HCN, said stripping column being a divided wall column and being operated in such a way that stripped HCN, water and largely regenerated methanol washing agent are withdrawn separately. In this process variant, no separate methanol/water separation column is required.

To further develop the process according to the invention, it is proposed that the HCN-enriched gas stream withdrawn from the stripping column is disposed of in an environmentally responsible manner. Preferably, for this purpose, the HCN-enriched gas stream withdrawn from the stripping column is fed to a Claus plant and combusted therein.

The invention further relates to apparatus for regenerating the loaded washing agent from a physical gas wash, in which one or more gas components are removed, to a large extent selectively, from a gas mixture (raw gas) to be purified at least in a first of at least two successive washing steps.

With respect to the apparatus, the object of the invention is achieved by the device being provided with a regeneration unit, in which the gas components, which have been selectively removed from the raw gas in the first washing step, may be separated from loaded washing agent and to which solely the loaded washing agent withdrawn from the first washing step may be supplied.

In an advantageous embodiment of the apparatus according to the invention there is provided that, in the regeneration unit, hydrogen cyanide (HCN) may be separated from methanol washing agent loaded with HCN, with the loaded methanol washing agent being withdrawn subsequent to the first washing step of a methanol wash, in which a raw synthesis gas is purified from sour gases ($H_2S$, COS) and/or carbon dioxide ($CO_2$) in at least one further washing step.

A variant of the device according to the invention provides for the regeneration unit to comprise a simple stripping column having a reboiler and overhead condenser, into which the methanol washing agent loaded with HCN may be introduced and from which an HCN-rich gas fraction and a largely HCN-free sump product that consists predominantly of methanol may be withdrawn. If the methanol washing agent loaded with hydrogen cyanide (HCN) contains water, then the sump product of the stripping column consists of a water/methanol mixture, in which case the device according to the invention advantageously comprises a methanol/water separation column, to which the methanol/water mixture may be supplied for separating it into a water fraction and a methanol fraction.

Another variant of the device according to the invention provides for the regeneration unit to comprise a divided wall column that is designed as a stripping column and has a reboiler and overhead condenser, into which methanol washing agent loaded with HCN and water may be introduced and from which an HCN-rich gas fraction, a largely HCN-free methanol fraction and water may be withdrawn separately.

BRIEF DESCRIPTION OF DRAWINGS

The invention shall be explained in more detail below with reference to two exemplary embodiments illustrated schematically in the FIGS. 1 and 2. Each exemplary embodiment concerns a methanol wash in which raw synthesis gas containing water residues is purified from water and hydrogen cyanide (HCN) in a first washing step and from carbon dioxide ($CO_2$) and sour gases ($H_2S$, COS) in a second washing step. A portion of the loaded methanol washing agent, which is withdrawn from the second washing step, is used as washing agent in the first washing step. In the two figures, the same plant components are denoted with the same symbols.

DETAILED DESCRIPTION OF DRAWINGS

The gas stream to be purified is introduced via line 1 into the lower portion of the wash column T1, in which it is purified from residual water and HCN to a large extent. The purified gas stream, which now comprises predominantly hydrogen and carbon monoxide, is withdrawn from the wash column and conveyed via line 2. Liquid methanol is introduced as washing agent into the head of the wash column via line 3 and, on its downward way, assisted by suitable fixtures, is brought into intensive contact with the gas stream flowing countercurrently. In the upper portion of the wash column, the sour gases COS and $H_2S$ as well as $CO_2$ are removed from the gas stream by absorption and concentrate in the methanol washing agent, which is subsequently withdrawn from the wash column via line 4 as loaded washing agent and is conveyed for the most part via line 5 for regeneration (not shown).

A small portion of the methanol washing agent loaded in the upper portion of the wash column is supplied via line 6 and the regulator a to the first washing step, which is carried out in the lower portion of the wash column, where it serves as washing agent for largely selective removal of HCN and residual water from the raw synthesis gas. The methanol washing agent loaded with water, HCN, $CO_2$, $H_2S$ and COS, concentrates in the lower region of the wash column T1, from where it is withdrawn via line 7. The loaded methanol washing agent is heated in the heat exchanger E1 against an $H_2S$-rich material stream 8, which originates from the not-shown methanol regeneration unit, and introduced via line 9 and the throttle b into a device for HCN separation (T2, T2a).

Figure 1:
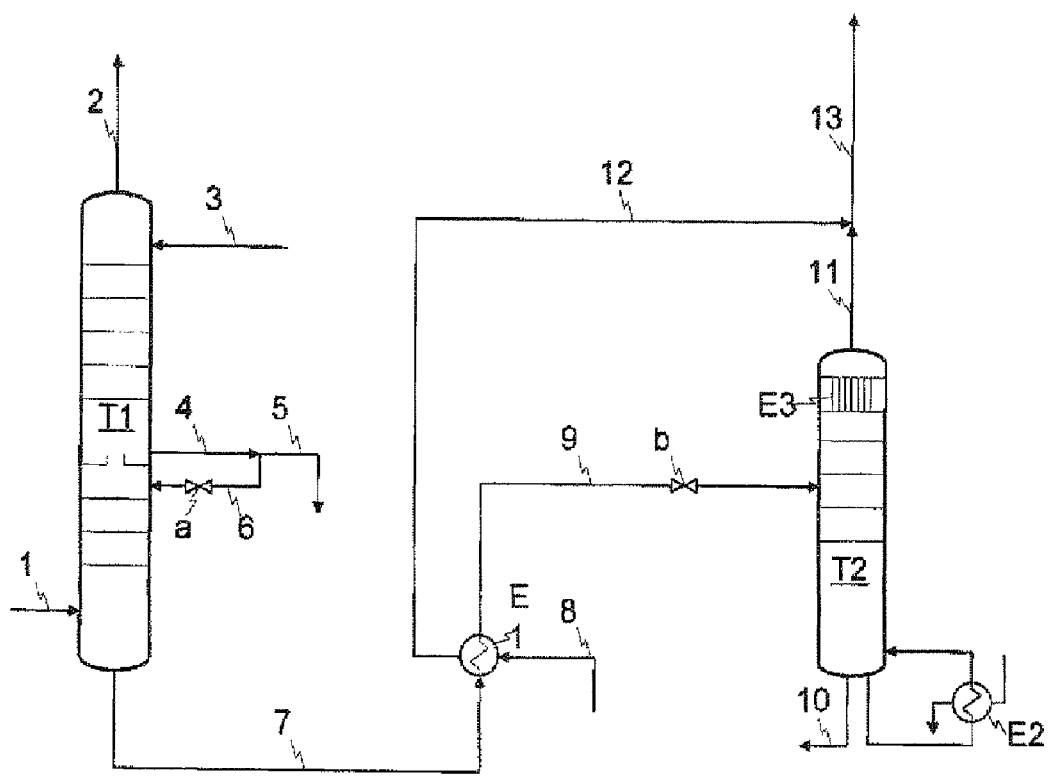

In the exemplary embodiment shown schematically in FIG. 1, the device for HCN separation T2 is a simple stripping column. The majority of the absorbed $CO_2$, COS and $H_2S$ is desorbed during the expansion of the heated loaded methanol washing agent through the throttle b. The HCN, which is bound much more strongly to the methanol than the sour gases, is stripped from loaded methanol washing agent in the HCN stripping column T2. The stripping gas required therefor is generated by boiling the sump product of the HCN stripping column T2, which consists predominantly of water and methanol. The energy required therefor is supplied to the sump product via the steam-heated reboiler E2. The HCN rises alongside the steam stream to the head of the HCN stripping column T2, where water and methanol are condensed in the head cooler E3. The sump product is withdrawn via line 10 and supplied to a not-shown water/methanol separation column, while the HCN leaves the HCN stripping column T2 alongside the sour gases via line 11 and is supplied, together with the $H_2S$ fraction 12, which is generated during the regeneration of the washing agent loaded in the second washing step of the methanol wash, via line 13 to a Claus plant (not shown) for sulfur recovery.

Figure 2:
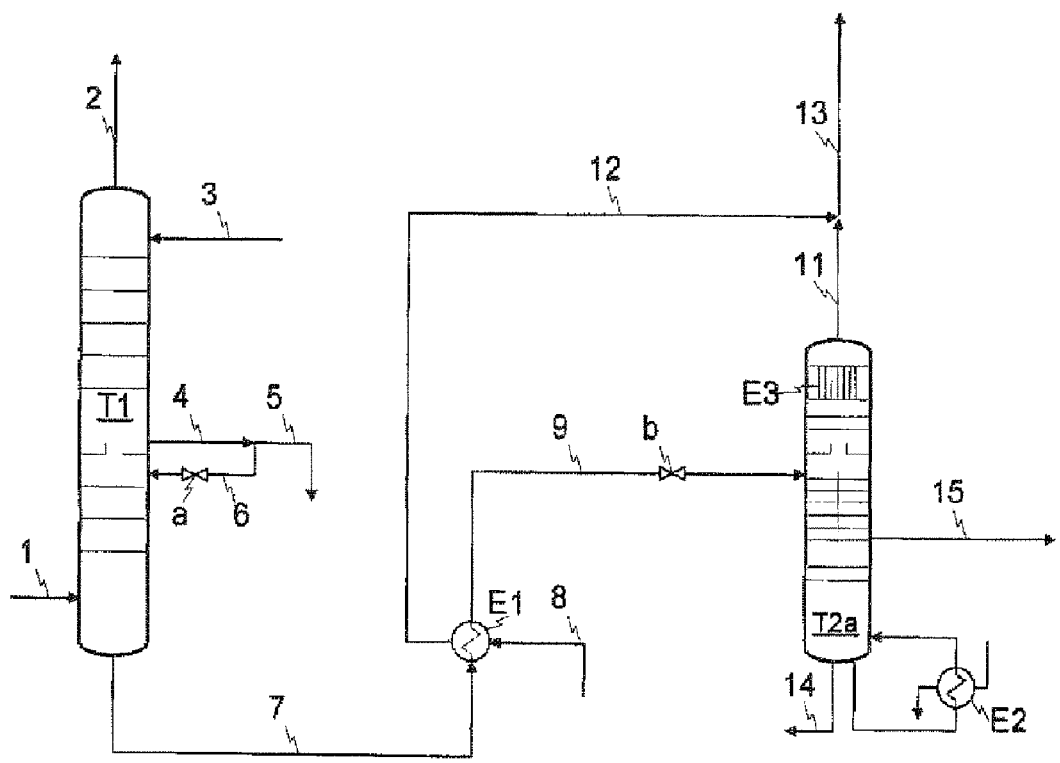

The exemplary embodiment shown in FIG. 2 differs from that shown in FIG. 1 in that the device for HCN separation is a stripping column T2a that is designed as a divided wall column. Using a divided wall column makes it possible to dispense with a water/methanol separation column, since merely water is generated as sump product in T2a, which is withdrawn via line 14 and disposed of. Substantially HCN-free methanol is removed via line 15 and introduced into the not-shown methanol regeneration unit, into which the methanol washing agent, which is diverted from the wash column T1 via line 5 and loaded with sour gases, is also fed for the purpose of regeneration.

In the two exemplary embodiments, the total quantity of the methanol washing agent regenerated by the different means is returned via line 3 and introduced into the wash column T1.

The preceding examples can be repeated with similar success by substituting the generically or specifically described reactants and/or operating conditions of this invention for those used in the preceding examples.

The entire disclosures of all applications, patents and publications, cited herein and of corresponding German application No. 10 2006 014 302.7, filed Mar. 28, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for regenerating loaded washing agent from a physical gas wash, said loaded washing agent comprising methanol, hydrogen cyanide and sour gases, said process comprising in a scrubbing column, separating hydrogen cyanide (HCN) from a raw synthesis gas in a first washing step with a washing agent comprising methanol and dissolved sour gases, separating remaining sour gases and/or carbon dioxide from said raw synthesis gas in at least one subsequent washing step by liquid cryogenic methanol, said liquid cryogenic methanol being used in a major amount compared to a minor amount being used in said first washing step, and withdrawing said major amount containing said remaining sour gases and/or carbon dioxide from the scrubbing column, withdrawing a methanol washing agent loaded with HCN from the methanol wash and expanding into a stripping column independently of the remaining quantity of loaded washing agent, generating a gas stream containing HCN by stripping in the stripping column, and feeding said gas stream to a Claus plant and combusting therein.

2. A process according to claim 1, wherein steam generated by boiling a sump product of the stripping column is used as stripping gas.

3. A process according to claim 1, wherein the withdrawn methanol washing agent loaded with HCN is from the first washing step.

4. A process according to claim 1, wherein the liquid cryogenic methanol that separated sour gases and/or carbon dioxide is regenerated.

* * * * *